United States Patent [19]
Foster et al.

[11] Patent Number: 4,990,305
[45] Date of Patent: Feb. 5, 1991

[54] SINGLE PEAK RADIAL TEXTURE ZIRCALOY TUBING

[75] Inventors: John P. Foster, Monroeville; Charles S. Cook, Murrysville; George P. Sabol, Export, all of Pa.

[73] Assignee: Westinghouse Electric Corp., Pittsburgh, Pa.

[21] Appl. No.: 372,483

[22] Filed: Jun. 28, 1989

[51] Int. Cl.$^5$ .................................................. G21C 3/32
[52] U.S. Cl. ...................................... 376/457; 72/367; 72/700
[58] Field of Search .................... 376/457; 72/367, 700

[56] References Cited

U.S. PATENT DOCUMENTS

| | | | |
|---|---|---|---|
| 3,689,324 | 8/1972 | Wiener et al. | 148/11.5 |
| 3,804,708 | 4/1974 | Nilson | 376/416 X |
| 4,390,497 | 6/1983 | Rosenbaum | 376/414 |
| 4,649,023 | 3/1987 | Sabol | 420/422 |
| 4,765,174 | 8/1988 | Cook et al. | 72/367 |
| 4,770,847 | 8/1988 | Meyer et al. | 376/444 |

*Primary Examiner*—Donald P. Walsh
*Assistant Examiner*—Meena Chelliah

[57] ABSTRACT

A method of producing enhanced radial texture in zirconium alloy tubing suitable for use in forming cladding for nuclear fuel rods is provided. The tubing production method described herein employs a combination of mechanical expansion and heat treatment steps in the final stage of tubing formation to produce a single peak radial texture in the tubing, thereby imparting enhanced resistance to pellet-cladding-interaction to the finished tubing. The tubing is preferably processed to a diameter within less than about 10 to 20% of the desired final diameter, annealed, and expanded less than about 10 to 20% to the desired final diameter, thereby producing a unique radial texture in the finished tubing. In an alternative method, the finally expanded tubing is subjected to a final recrystallization anneal to produce a significantly enhanced split radial texture.

17 Claims, 6 Drawing Sheets

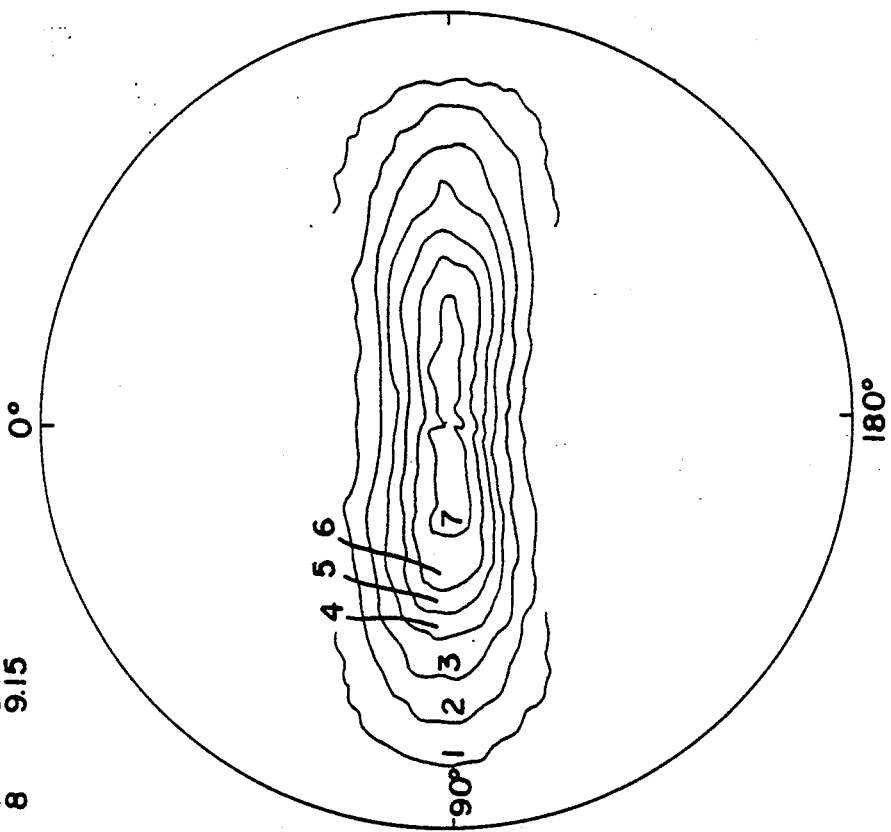
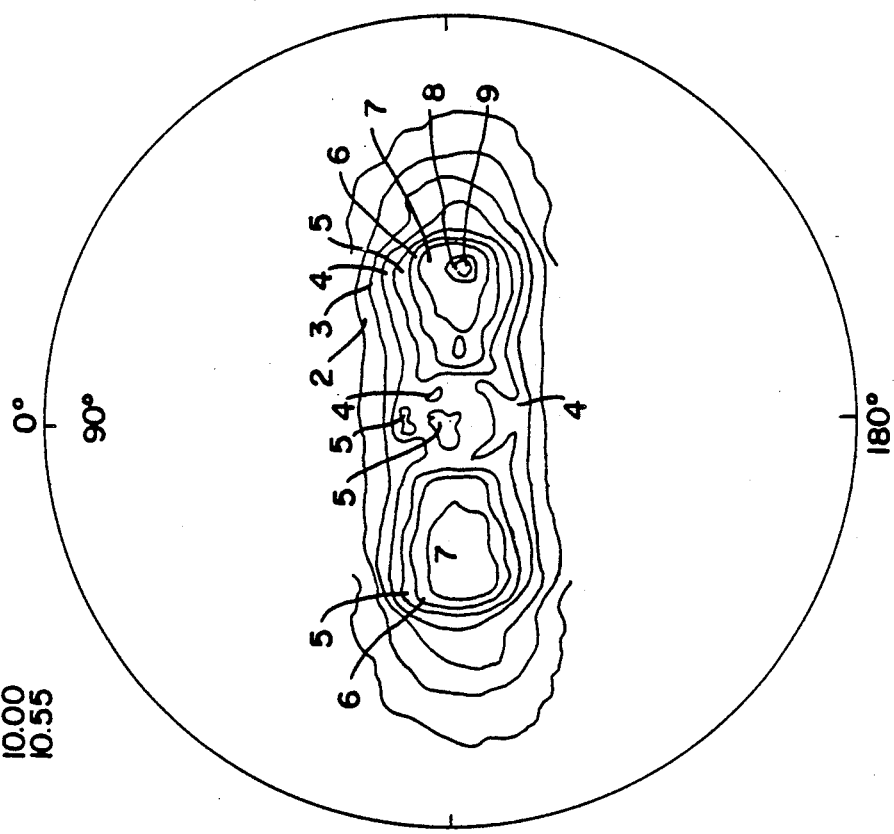

SINGLE PEAK RADIAL TEXTURE ZIRCALOY TUBING

TECHNICAL FIELD

The present invention relates generally to the production of tubing having a desired final diameter by combination of mechanical and thermal processing steps and particularly to a method for producing tubing of a desired final diameter made of zirconium alloys which creates an enhanced radial texture in the tubing.

BACKGROUND ART

Tubing made of zirconium alloys is widely employed in the nuclear industry, primarily as cladding for nuclear fuel rods. This particular application requires a relatively thin-walled tubing that is resistant both to chemical attack and mechanical attack. Such tubing is typically formed by a combination of mechanical and thermal treatments. Pilgering, one commonly employed tubing formation method, changes the texture of the tubing by gradually reducing the cross-sectional diameter of the tubing while simultaneously increasing the axial elongation of the tubing until the desired optimum final diameter and tube wall thickness are achieved. This process causes the hydrides in the tubing material to be oriented in a circumferential direction.

Nuclear fuel cladding tubes subjected to nuclear radiation for the prolonged periods of time characteristic of nuclear reactor operating cycles tend to expand axially. This irradiation-induced axial cladding deformation is also accompanied by a reduction in the radial thickness of the tubing wall and a concomitant decrease in end of cycle life ductility. Texturing the cladding tubes has been found to reduce or avoid some of the problems associated with lengthy use in a reactor environment. One method of texturing, which reduces axial irradiation growth and increases end of cycle life ductility, has been proposed in U.S. Pat. No. 3,804,708. This result is achieved by expanding the tube diameter while constraining the tube ends to prevent an increase in length relatively greater than the increase in diameter. Although tubing having the texture produced according to this method represents an improvement over that of previously available tubing, it is not as resistant to pellet-cladding interaction as could be desired.

The zirconium alloys preferred for use in tubing for nuclear applications have a hexagonal close packed crystal structure. The orientation of the basal poles of the metal crystals has been determined to have a significant effect on the texture and, hence, the ultimate properties of tubing formed from zirconium alloys. Increasing the zirconium alloy radial texture produces tubing that is less likely to be susceptible to chemical and/or mechanical attack than nontextured or only slightly textured tubing metal. The method of the aforementioned U.S. Pat. No. 3,804,708 orients the tubing zirconium alloy crystals so that the basal pole principal components are predominantly in both the radial and axial directions. However, orientation of the basal poles to the radial direction to increase the radial texture produces tubing with enhanced properties.

A method of increasing the radial texture of basal poles in the crystal structure of zirconium is disclosed in U.S. Pat. No. 4,765,174. The method described in this patent, however, only achieves an appreciable increase in final tube radial texture when the tubing is processed during the intermediate stages prior to expansion to the final tubing diameter. The zirconium alloy tubing processing method described in this patent exhibits an improved texture over that previously achieved. However, the split radial texture characteristic of zirconium alloy tubing produced according to this method may not provide optimal pellet-cladding-interaction resistance or resistance to chemical attack and/or mechanical deformation. Moreover, because the thermal and mechanical processing described in U.S. Pat. No. 4,765,174 takes place before the final tubing expansion, the degree of precise control over the final tubing texture desired may not always be possible.

A need exists, therefore, for a method of texturizing zirconium alloy tubing for use as cladding in nuclear fuel rods that is performed during the final tubing processing stages to produce tubing with an increased radial texture. The prior art fails to disclose a method for producing a zirconium alloy tubing characterized by a high degree to radial texture wherein the increased texture is produced during the final stage of tubing fabrication. Further, the prior art fails to disclose a method for producing a highly textured zirconium alloy tubing having a single peak radial basal pole texture.

SUMMARY OF THE INVENTION

It is a primary object of the present invention, therefore, to overcome the disadvantages of the prior art discussed above and to provide a method for producing a relatively thin-walled, textured zirconium alloy tubing wherein a high degree of radial texture is imparted to the tubing walls during the final stage of tubing fabrication.

It is another object of the present invention to provide a method for producing a highly textured zirconium alloy tubing having a single peak radial basal pole texture.

It is a further object of the present invention to provide a method for producing a textured zirconium alloy tubing wherein enhanced radial texture is achieved by expansion of the tubing to final size dimensions.

It is yet a further object of the present invention to provide a method for producing textured zirconium alloy tubing wherein an enhanced split pole radial texture is achieved by a final mechanical expansion followed by a final heat treatment.

In accordance with aforesaid objects, a method for producing a highly textured zirconium alloy tubing having a single pole radial texture suitable for use in forming cladding for nuclear fuel rods is provided. The method includes the steps of processing the tubing to a diameter near the desired final diameter of the finished tubing, preferably to a diameter that is less than about 10 to 20% of the final diameter, optionally subjecting the expanded diameter tubing to a stress relief anneal or to a recrystallization anneal, and then expanding the diameter of the tubing to the desired final diameter, thereby producing a unique single peak radial texture in the finished tubing. An alternate embodiment of this method includes the additional step of performing a final recrystallization anneal on the finally sized tubing to produce an enhanced split pole radial texture in the tubing.

Other objects and advantages of the present invention will be apparent from the following description, claims and drawings.

BRIEF DESCRIPTION OF THE DRAWINGS

FIG. 2A illustrates the basal pole texture of the Zr-2 tubing prior to expansion;

FIG. 2B illustrates the basal pole texture of the Zr-2 tubing of FIG. 2A after expansion;

DETAILED DESCRIPTION OF THE INVENTION

Figure 1:
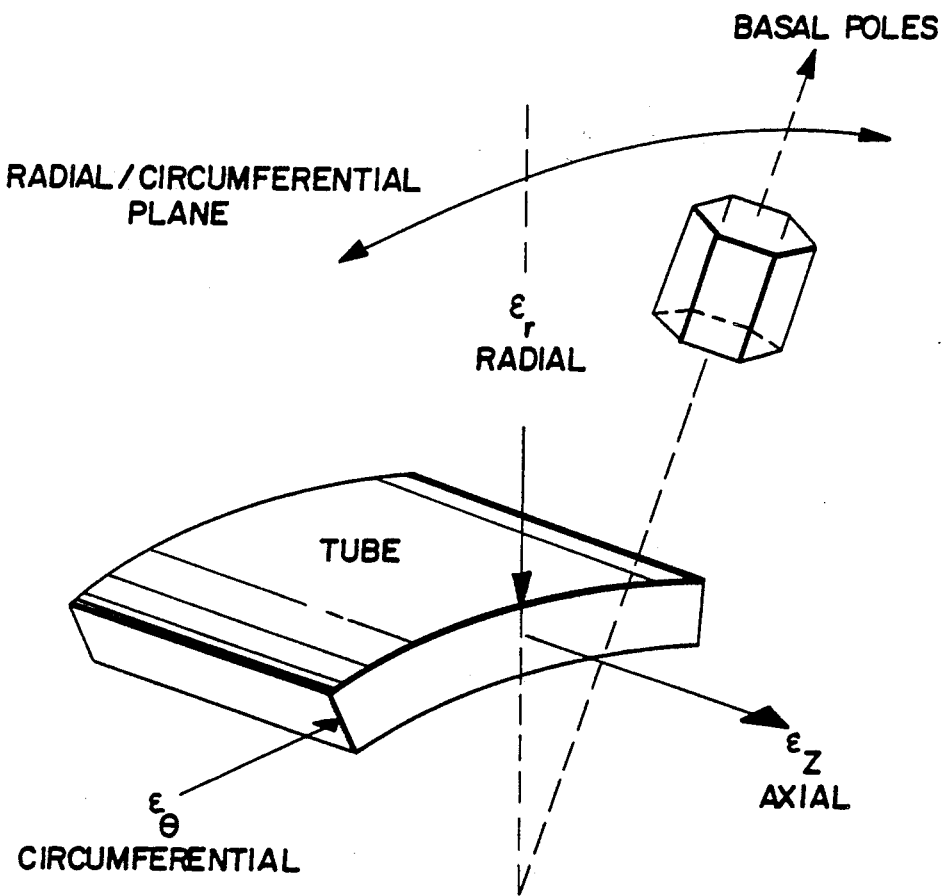
FIG. 1 illustrates schematically the basal pole orientation typically produced in zirconium alloy tubing by deformation processing.

The production of zirconium alloy tubing suitable for use as cladding in nuclear fuel rods has conventionally been achieved by performing a combination of mechanical and thermal treatments on extruded tubing. The mechanical treatments most commonly employed are the cold deformations produced by pilgering.

Pilgering simultaneously increases the axial length of the tubing, decreases the tube wall thickness and reduces the tube diameter. Pilgering additionally imparts some texture to the tubing. Generally, multiple pilger reductions are used to reduce the cross-sectional diameter of the tubing. The thermal treatments typically use vacuum annealing for the intermediate and final stages of processing. The zirconium alloy most often used for nuclear fuel cladding, known as Zircaloy, usually does not recrystallize below about 1000 degrees F. Heat treatment below this temperature is termed a stress relief anneal, while heat treatment above this temperature is referred to as a recrystallization anneal.

One known process for the production of zirconium alloy tubing for nuclear fuel cladding has four basic steps, each of which includes a pilger reduction pass followed by a heat treatment. The first three steps are the intermediate processing stages, and the fourth step is the final processing stage. Heat treatment during the intermediate stages is usually conducted at recrystallization temperatures, while the final heat treatment is a stress relief anneal. The tubing may be expanded during the intermediate tube reduction step just prior to the final stage and then recrystallized to increase the radial texture of the tubing. This method is described in commonly owned U.S. Pat. No. 4,765,174, the disclosure of which is hereby incorporated by reference. However, the texture produced according to this method is a split radial texture, not the more desirable unique single pole radial texture, produced according to the present method.

Texture in zirconium alloys is commonly determined by x-ray methods and described by calculating the Kearns texture parameter, $f_r$, and Kallstrom number, $K$. The Kearns texture parameter indicates the fraction of all basal poles present in a material that are effectively oriented in any of the three reference directions, radial ($f_r$), circumferential ($f_{rc}$), or axial ($f_{ra}$) in a tube. The value of $f_r$ can vary between 0.0 and 1.0. In an isotropic, untextured material, $f_r$ would be about 0.33, while in a Zircaloy nuclear fuel clad tubing, $f_r$ would be greater than about 0.5, with the basal poles oriented predominantly in the radial direction. The Kallstrom texture number indicates the fraction of radially oriented basal poles in the radial - circumferential plane. The Kallstrom number can vary between $-1.0$ and $+1.0$.

Alternatively, texture in Zircaloy tubing may be determined by measuring the anisotropy of plastic deformation using the contractile strain ratio (CSR) test. The CSR is the ratio of circumferential to radial strains accompanying a small amount of axial elongation in a tensile test. Zircaloy tubes are usually textured with the basal poles generally oriented toward the radial direction. Moreover, since the resistance to deformation is highest in the basal pole direction, CSR values in Zircaloy cladding tubes are greater than 1.0.

Referring to the drawings, FIG. 1 illustrates schematically the relationship of the basal poles of the crystal structure of a zirconium alloy tubing to the axial, circumferential and radial directions of deformation of a segment of tubing. The basal poles of the zirconium alloy crystal structure tend to be oriented in the plane normal to tensile deformation. Therefore, an increment of tensile deformation in the circumferential direction is used to produce a more radial orientation of the basal poles in the transverse plane of the tubing. This results in the reorientation of the circumferentially oriented basal poles to a more radial orientation. The radial texture of the tubing increases as the radial orientation of the basal poles increases.

During the pilgering of Zircaloy tubing positive deformation occurs in the axial direction and results in the basal poles being oriented in the transverse plane defined by radial-circumferential directions, as seen in FIG. 1. Within the transverse plane, the basal poles tend to be further aligned in the direction of greatest compressive deformation. The relative amounts of radial and circumferential compressive deformation applied to the tubing during Zircaloy tube manufacture control the radial texture in the final product. A higher amount of radial compressive deformation than circumferential deformation produces a higher radially textured product. As discussed hereinabove, increasing the radial texture in Zircaloy tubing enhances the resistance of the tubing to chemical attack and mechanical deformation.

Table I below represents schematically two tube fabrication processes, one with an intermediate expansion step and one without. The outside diameter (OD) values obtained as a result of processing with only intermediate reduction steps and processing with one intermediate expansion step are listed for each step. The designation "RX" represents a recrystallization anneal, and the designation "SRA" represents a stress relief anneal. In the case of processing with only reduction steps, cold reduction steps 1 to 4 comprise the intermediate stage and the expansion step comprises the final stage of dimensional processing. In the case of processing with an intermediate expansion step, cold reduction steps 1 to 4 and expansion step 1 comprise the intermediate stage and expansion step 2 comprises the final stage of dimensional processing. The specific type of texture finally developed in the tubing is dependent on the final heat treatment. The final stage expansion step produces a unique single pole radial basal pole texture not heretofore produced in nuclear fuel cladding tubes. This texture is achieved using a final expansion and SRA heat treatment. Alternatively, an enhanced radial split texture may be developed using a final RX heat treatment.

TABLE I

| Processing With Reduction Steps | | Processing With An Intermediate Expansion Step | |
|---|---|---|---|
| | OD (in) | | OD (in) |
| TREX | 2.50 | TREX | 2.50 |
| RX | | RX | |
| Cold Reduction 1 | 1.75 | Cold Reduction 1 | 1.75 |
| RX | | RX | |
| Cold Reduction 2 | 1.25 | Cold Reduction 2 | 1.25 |
| RX | | RX | |
| Cold Reduction 3 | 0.70 | Cold Reduction 3 | 0.63 |
| RX | | RX | |
| Cold Reduction 4 | 0.339 | Expansion 1 | 0.70 |
| SRA or RX | | RX | |
| Expansion | 0.375 | Cold Reduction 4 | 0.339 |
| Final Heat Treatment | | SRA or RX | |
| | | Expansion 2 | 0.375 |
| | | Final Heat Treatment | |

FIGS. 2A, 2B, 3A, 3B, 4A, 4B, 5A and 5B illustrate the texture changes which occur in three different zirconium alloys as a result of final stage expansion according to the present invention. These Figures are stereograms representing the specific contours of the texture of tubing samples measured at a midwall position. The radial direction is the center point of the stereogram. The axial direction is at the twelve o'clock position, and the hoop direction is at the three and nine o'clock positions. A digit contour table in each of the drawings provides the relative contour values and illustrates the areas of maximum and minimum contour. The tubing was first expanded to a diameter near the final desired tubing diameter, preferably to a diameter within less than about 20% of the final diameter and then expanded to the final diameter. This first expansion is more preferably within less than about 15%, and most preferably to within less than about 10%, of the final diameter. In some circumstances a final expansion of about 3% is optimum.

FIGS. 2A and 2B demonstrate the differences in texture of a Zircaloy-2 tube, respectively, before and after final stage expansion according to the present invention. Zircaloy-2 is an alloy having the following composition:
about 1.2-1.7% by weight tin (Sb),
about 0.07-0.20% by weight iron (Fe),
about 0.05-0.15% by weight chromium (Cr),
about 0.03-0.08% by weight nickel (Ni),
and the balance essentially zirconium (Zr).
The direct pole figure of a recrystallized tube shown in FIG. 2A has a maximum contour of 10.6 at angles of ±40 degrees relative to the radial direction. At the radial direction, however, the contour level decreases to a value in the range of 4 to 5. The texture shown in FIG. 2A, which is typical of Zircaloy tubing, is generally referred to as a split ±40 degree radial basal pole texture.

FIG. 2B illustrates the novel single peak radial texture produced in the Zircaloy-2 tubing of FIG. 2A following final stage expansion of the tubing according to the present invention. This tubing was hydraulically expanded following the last intermediate stage recrystallization. The texture contour of FIG. 2B clearly differs significantly from that of FIG. 2A. A single peak radial texture is produced as a result of this final stage expansion. It is clear from FIG. 2B that, for angles of ±30 degrees relative to the radial direction, the contour level is above 8.0 but less than the maximum of 9.2. Although the maximum contour in FIG. 2B is slightly less than that of FIG. 2A, the split radial texture of FIG. 2A has been transformed into a single peak having a more radial orientation. The single peak texture of FIG. 2B, which is in the radial-tangential plane, has a more radial orientation because the split ±40 degree texture is transformed into a single peak. The single peak of FIG. 2B is subtended by angles of ±30 degrees relative to the radial direction. This represents a decrease relative to the split ±40 degree texture of FIG. 2A and, hence, a more radial texture. Table II below shows that expansion increased the Kearns radial texture parameter and the Kallstrom number.

Figure 3A:
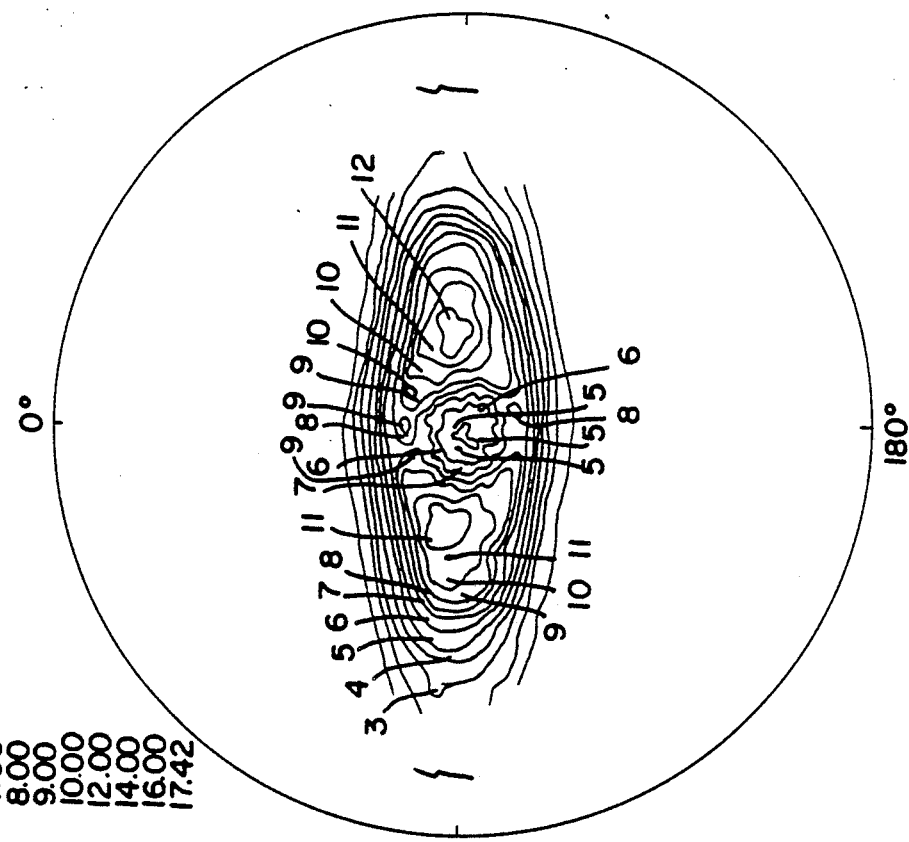
FIG. 3A illustrates the basal pole texture of the Type A Zr-4 tubing prior to expansion.
Figure 3B:
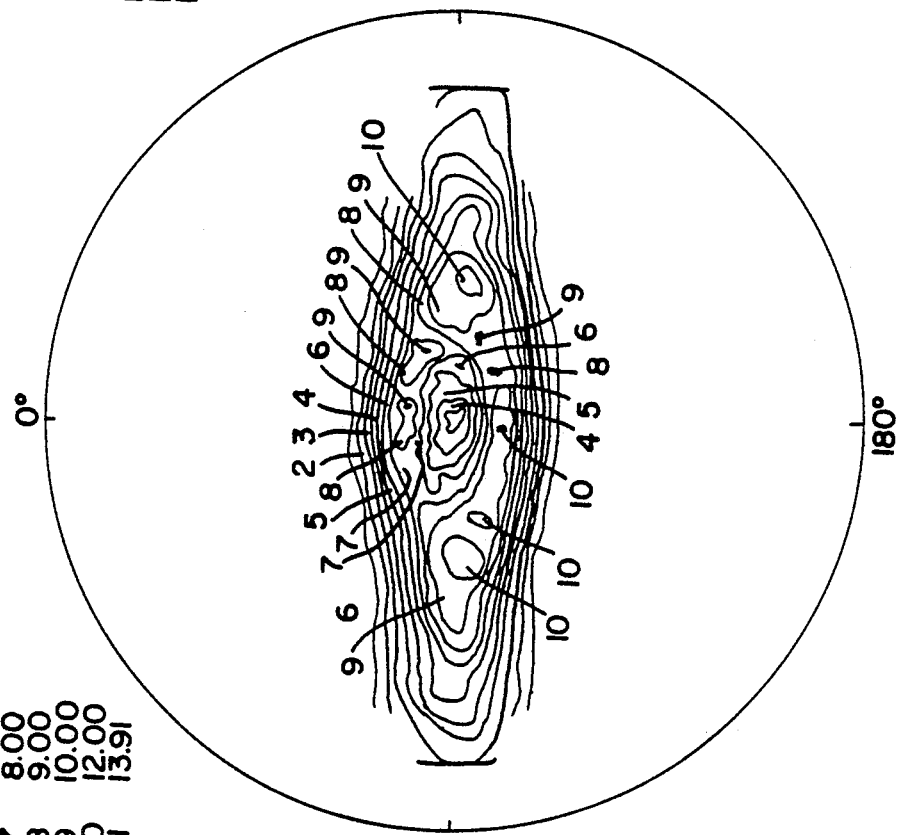
FIG. 3B illustrates the basal pole texture of the Type A Zr-4 tubing of FIG. 3A after expansion.
Figure 4A:
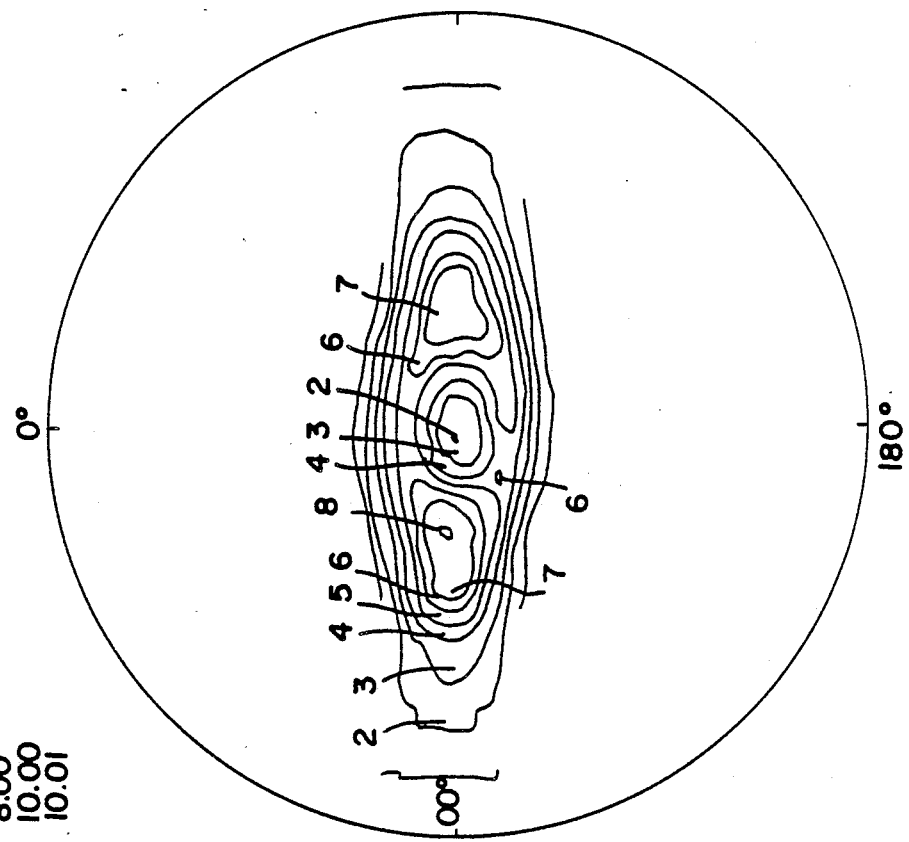
FIG. 4A illustrates the basal pole texture of the Type B Zr-4 tubing prior to expansion.
Figure 4B:
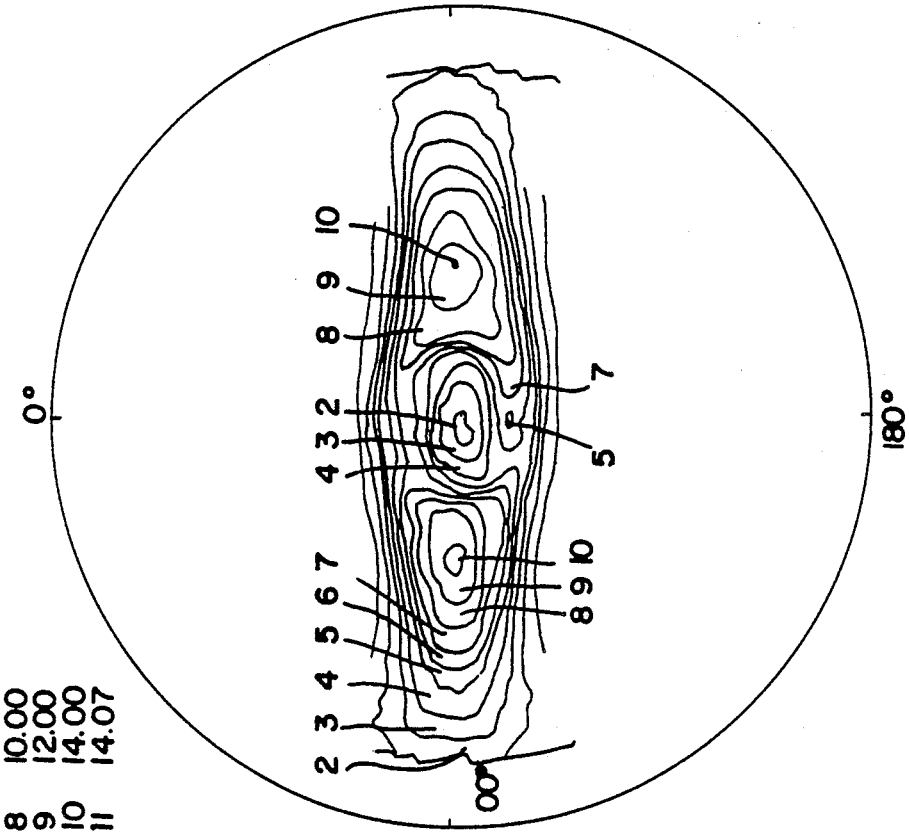
FIG. 4B illustrates the basal pole texture of the Type B Zr-4 tubing of FIG. 4A after expansion.

FIGS. 3A, 3B, 4A and 4B illustrate the radial or basal pole texture of Zircaloy-4, another zirconium alloy commonly used to form tubing for use as cladding for nuclear fuel rods. Zircaloy-4 is an alloy having the following composition:
about 1.2-1.7% by weight tin (Sb),
about 0.12-0.18% by weight iron (Fe),
about 0.05-1.5% by weight chromium (Cr),
and the balance essentially zirconium (Zr). The Zircaloy-4 tubing was given two different OD expansion strain values. The Type A tubing was expanded 7.0%, and the stereograms are shown in FIGS. 3A and 3B. The Type B tubing was expanded 5.8%, and the stereograms are shown in FIGS. 4A and 4B. In the case of the Type A Zircaloy-4, Table II below shows that expansion decreased the angle between the contours of maximum intensity from ±39 to ±28 degrees. Further, expansion increased the Kearns radial texture parameter and the Kallstrom number. Table II and FIGS. 4A and 4B illustrate similar behavior for the Type B Zircaloy-4.

Figure 5A:
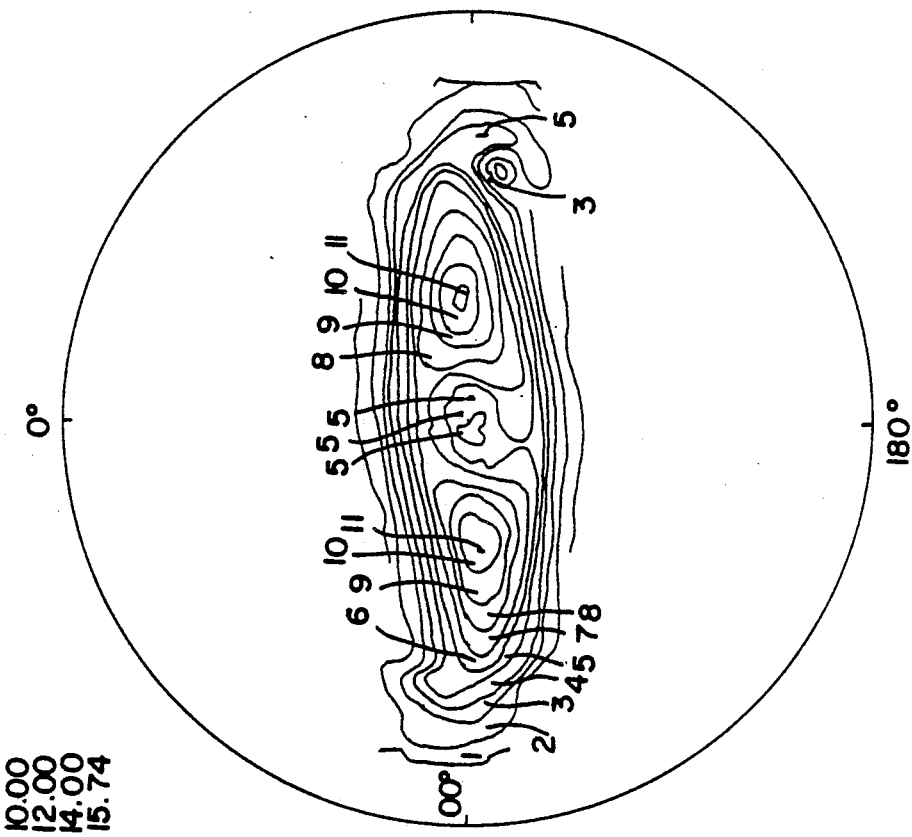
FIG. 5A illustrates the basal pole texture of the ZIRLO tubing prior to expansion.
Figure 5B:
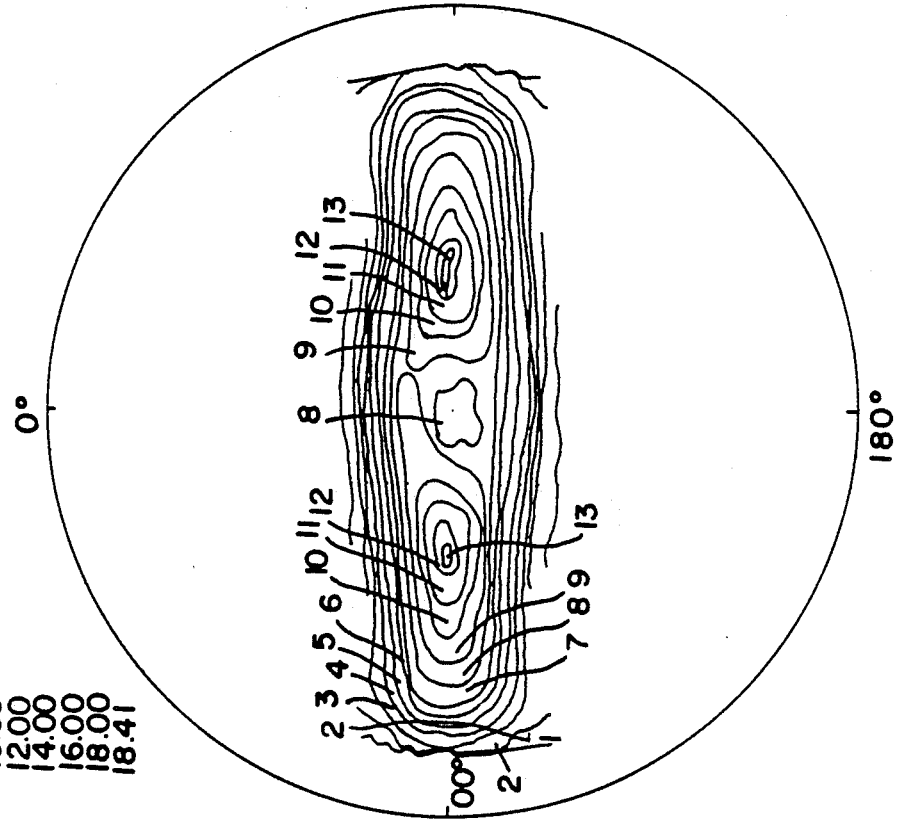
FIG. 5B illustrates the basal pole texture of the ZIRLO tubing of FIG. 5A after expansion.

FIGS. 5A and 5B illustrate the enhanced radial texture changes produced by the method of the present invention in a third zirconium alloy used to form cladding tubes, ZIRLO. The composition of ZIRLO is described in commonly owned U.S. Pat. No. 4,649,023, the disclosure of which is hereby incorporated by reference. The basal pole or radial texture of this alloy also changes to a more radial orientation as measured by the decrease in angle between the contours of maximum intensity and the increase in the Kearns radial texture parameter and Kallstrom numbers. The novel highly desirable single peak radial texture of the present invention is also produced in tubing made from this alloy as a result of final stage expansion.

The texture changes shown in FIGS. 2B, 3B, and 4B and 5B were produced as a result of employing a closed end hydraulic expansion method which internally pressurizes the tubing to create a 2:1 hoop:axial stress ratio. Alternatively, a plug drawing process, which could reduce this ratio, could be used to achieve the desired expansion.

Figure 6:
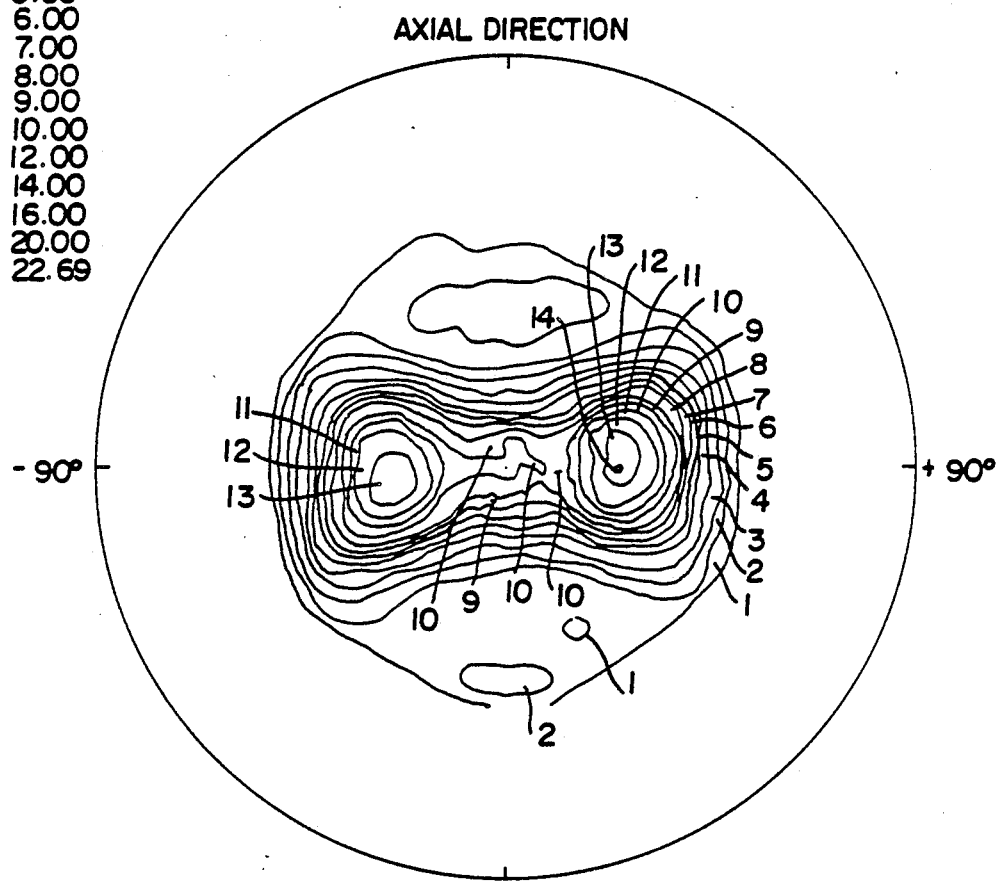
FIG. 6 illustrates the texture produced by a second embodiment of the present invention.

The radial texture of the expanded zirconium alloy tubing produced according to the present process may be left in the desirable single peak configuration or may be given yet a different radial texture by performing a recrystallization anneal after the final stage expansion. FIG. 6 illustrates the radial texture contours produced by first expanding and then recrystallizing the tube of FIG. 2A. The single peak radial texture of FIG. 2B is not produced by these steps. Rather, this final stage expansion followed by a recrystallization anneal produces a significantly enhanced split peak radial texture not heretofore produced in zirconium alloy tubing. The maximum contour of the tubing increases from the 9.2 maximum of FIG. 2B to 22.7. In addition, the angles associated with the maximum contour of FIG. 2A decrease from ±40 degrees to ±30 degrees relative to the radial direction.

A comparison of the texture produced in FIGS. 2A, 3A, 4A and 5A with that produced in FIG. 6 illustrates the enhanced effects on radial texture produced by this final tube heat treatment.

The yield stress produced in the final tubing by the present process may be either intermediate between recrystallized annealed and as-cold worked or recrystallized annealed. If the tube microstructure is not recrystallized, the heat treatment is commonly referred to as a stress-relief anneal. This is achieved by fabrication of the tubing, preferably by pilgering, to near final size dimensions, annealing the tubing and then expanding the tubing to the desired final size dimensions. The single peak radial texture produced according to this process, illustrated in FIG. 2B, has not heretofore been produced in fuel rod cladding tubes. In addition, the radial texture of tubing produced according to this method may be enhanced even further by employing the intermediate stage expansion and recrystallization described in U.S. Pat. No. 4,765,174 in conjunction with the final stage expansion described herein. This intermediate expansion and recrystallization is preferably performed at one of the intermediate steps (Table I) prior to the pilgering of the tubing to within less than about 10 to 20% of the final size dimensions.

The production of recrystallized yield stress in the zirconium tubing is achieved in accordance with the alternate embodiment of the present method discussed in connection with FIG. 6 above. The tubing is fabricated, preferably by pilgering, to near final size dimensions, preferably to a diameter that is within less than about 10 to 20% of the final diameter, and subjected to a recrystallization anneal. The recrystallized tubing is then expanded, most preferably less than about 10% of its diameter, to the desired final diameter and a final heat treatment in the form of a recrystallization anneal is performed to produce the enhanced split radial texture of FIG. 6. Further enhancement of the FIG. 6 final tube texture may also be achieved by employing the intermediate stage expansion step of U.S. Pat. No. 4,765,174 at one of the intermediate stage steps prior to pilgering to within less than about 10 to 20% of the final diameter.

The following Examples further illustrate the texture enhancement produced in zirconium alloy tubing in accordance with the methods described herein. Tubing samples composed of the three zirconium alloys discussed above, Zircaloy 2 (Zr-2), Zircaloy-4 (Zr-4) and ZIRLO, were hydraulically expanded, and texture measurements were performed on each of the expanded tubing samples. Each of the samples was heat treated prior to expansion. The Zircaloy-2 (Zr-2) was subjected to a recrystallization anneal, and each of the other zirconium alloys was subjected to a stress relief anneal. The hydraulic expansion data and texture measurements obtained on these samples are presented in Table II below.

TABLE II

| Material | Type | Initial Tubing Dimensions OD × Wall (mils) | Condition | OD True Strain (%) | Maximum Intensity (degrees) | Kearns Radial Texture Parameter (fr) | Kallstrom Number (K) |
|---|---|---|---|---|---|---|---|
| Zr-2 | — | 650 × 74 | RX° | — | 40 | 0.530 | 0.30 |
|  |  |  | Expanded | 9.2 | 0 | 0.590 | 0.34 |
| Zr-4 | A | 382 × 25 | SRA°° | — | 39 | 0.586 | 0.16 |
|  |  |  | Expanded | 7.0 | 28 | 0.611 | 0.50 |
| Zr-4 | B | 374 × 23 | SRA°° | — | 36 | 0.530 | 0.12 |
|  |  |  | Expanded | 5.8 | 32 | 0.55 | 0.23 |
| ZIRLO | — | 374 × 23 | SRA°° | — | 38 | 0.531 | 0.21 |
|  |  |  | Expanded | 3.6 | 35 | 0.55 | 0.26 |

°Recrystallization Annealed (Heat treated at > 1000° F.)
°°Stress Relief Annealed (Heat treated at < 1000° F.)

The above results clearly demonstrate that hydraulic expansion increases the radial texture of the tubing. Final stage expansion produces an increase in both the Kearns parameter ($f_r$) and the Kallstrom number (K). The changes in the values of these parameters are specifically indicative of radial texture increases. FIGS. 2A, 2B, 3A, 3B, 4A, 4B, 5A and 5B further show that final stage expansion moves the tubing contours from the tangential to the radial direction.

Figure 7:
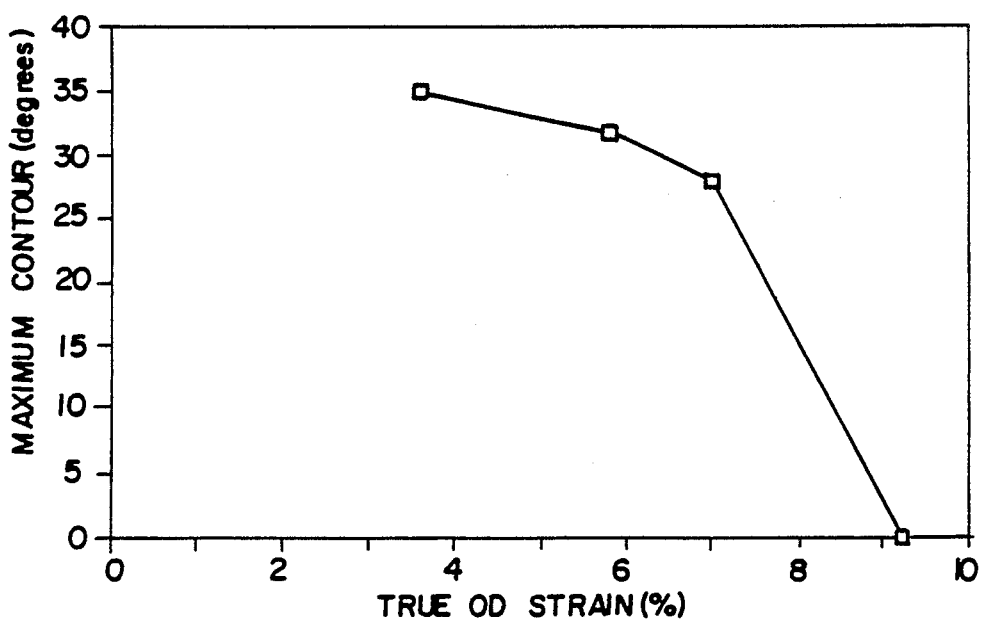
FIG. 7 represents graphically the dependence of the basal pole angle of maximum intensity on circumferential expansion strain.

FIG. 7 illustrates, graphically, the dependence of the production of single pole radial texture on circumferential expansion strain. Expansion strains greater than about 9% are required to produce the novel single pole radial texture in zirconium alloy tubing produced by the present invention. Consequently, the tubing is most preferably expanded to within less than about 10% of the final diameter prior to the final stage expansion to achieve this result. The zirconium alloy tubing may also be subjected to either a stress-relief anneal or a recrystallization anneal prior to expansion to produce optimally enhanced radial texture in the tubing.

The desirability of increasing the radial texture of tubing used for nuclear fuel rod cladding has been affirmed by tests comparing the response of tubing with and without increased radial texture to simulated fuel rod pellet-cladding interaction (PCI) failure. Tubing having a higher degree of radial texture exhibits increased resistance to simulated PCI failure. Consequently, tubing having an enhanced radial texture, such as the unique single pole radial texture of the present invention, can be employed to produce cladding with increased resistance to PCI failure and other kinds of chemical attack and mechanical deformation characteristic of the fuel rod environment in a nuclear reactor.

INDUSTRIAL APPLICABILITY

The present invention will find its primary application in the production of fuel rod cladding tubes for nuclear reactors from zirconium alloy tubing, where the unique single pole radial texture produced according to the methods described herein makes such tubing capable of functioning reliably within the environment typical of a nuclear reactor. However, the methods described herein may be used to enhance the radial texture and, thus, the resistance to chemical attack and/or mechanical deformation of any metal having a close-packed hexagonal crystal structure.

We claim:

1. A method of producing finished tubing composed of a zirconium alloy and having a desired final outside diameter useful for nuclear fuel rod cladding including the steps of:
   a. processing tubing composed of a zirconium alloy and with an initial outside diameter to produce tubing having an intermediate outside diameter about 20% less than the desired final diameter of the finished tubing;
   b. annealing said intermediate diameter processed tubing; and
   c. finally expanding the intermediate diameter of the processed tubing about 20% of the desired tubing final outside diameter dimension, thereby producing a single peak radial texture in the finished tubing.

2. The tubing production method described in claim 1, wherein in step (a) said tubing is processed to an intermediate outside diameter about 10% less than the desired final diameter, and in step (c) said processed tubing is expanded about 10%.

3. The tubing production method described in claim 1, wherein in step (a) said tubing is processed to an intermediate outside diameter about 3% of the desired final diameter, and in step (c) said processed tubing is expanded about 3%.

4. The tubing production method described in claim 1, wherein in step (b) the tubing is subjected to a recrystallization anneal.

5. The tubing production method described in claim 1, wherein in step (b) the tubing is subjected to a stress-relief anneal.

6. The tubing production method described in claim 1, wherein the Kearns radial texture parameter is increased by a value of 0.02 to 0.06 by the final diameter expansion of step (c).

7. The tubing production method described in claim 1, further including the steps, prior to step (a), of first subjecting the tubing to an expansion of the tubing starting diameter and then subjecting the expanded tubing to a recrystallization anneal.

8. The tubing production method described in claim 1, wherein said zirconium alloy is selected from the group consisting of ZIRCALOY-2, ZIRCALOY-4 and ZIRLO.

9. A method of producing finished tubing composed of a zirconium ally and having a desired final diameter useful for nuclear fuel rod cladding including the steps of:
   a. first expanding the initial diameter of the tubing to an intermediate diameter, said intermediate diameter being about 10 to 20% smaller than the desired final diameter of the finished tubing;
   b. subjecting the expanded tubing to an anneal;
   c. finally expanding the diameter of the annealed tubing about to 10 to 20% to the desired final diameter dimension; and
   d. subjecting the desired final diameter tubing to a recrystallization anneal, thereby producing an enhanced radial texture in the finished tubing.

10. The tubing production method described in claim 9, wherein the finished tubing has an enhanced split radial texture.

11. The tubing production method described in claim 9, wherein the anneal of step (b) is a recrystallization anneal.

12. The tubing production method described in claim 9, wherein the anneal of step (b) is a stress relief anneal.

13. The tubing production method described in claim 9, wherein the zirconium alloy is selected from the group consisting of ZIRCALOY-2, ZIRCALOY-4 and ZIRLO.

14. A method of producing zirconium alloy tubing suitable for use in forming cladding for nuclear fuel rods including the steps of:
   a. pilgering the tubing to a diameter within about 3 to 20% of the desired final diameter dimension;
   b. annealing the pilgered tubing; and
   c. hydraulically expanding the tubing about 3 to 20% to the desired final diameter, thereby increasing the radial texture of said tubing.

15. The tubing production method described in claim 14, further including the step of, after step (c), recrystallization annealing said finally expanded tubing.

16. The tubing production method described in claim 14, wherein in step (c) said tubing is hydraulically expanded about 10%.

17. The tubing producing method described in claim 14, wherein in step (c) said tubing is hydraulically expanded about 3%.

* * * * *